United States Patent [19]

Garden et al.

[11] 4,114,463
[45] Sep. 19, 1978

[54] DRIVE MEANS AND HARVESTING APPARATUS INCORPORATING SAME

[75] Inventors: Graham Miller Garden; Richard James Harwood, both of Christchurch, New Zealand

[73] Assignee: New Zealand Inventions Development Authority, New Zealand

[21] Appl. No.: 594,566

[22] Filed: Jul. 9, 1975

[51] Int. Cl.² .............................................. F16H 33/00
[52] U.S. Cl. ........................................... 74/61; 56/330
[58] Field of Search ...................... 56/330, 228; 74/20, 74/665 GE, 61

[56] References Cited

U.S. PATENT DOCUMENTS 3,344,591 10/1967 Christie et al. .......................... 56/330

FOREIGN PATENT DOCUMENTS 903,602 8/1962 United Kingdom ............... 74/665 GE Primary Examiner—Benjamin W. Wyche
Assistant Examiner—Wesley S. Ratliff, Jr.
Attorney, Agent, or Firm—James & Franklin

[57] ABSTRACT

The invention relates to a drive for a straddle type berry harvester suitable in particular for harvesting raspberries. The harvester has a frame mounted on wheels movable over a row of berry plants and having opposed rotatable upright cylindrical tined shakers connected above by universals to output shafts of a drive and mounted above conveyors in laterally slidable bearings to avoid obstructions in their path. Spring-mounted interleaved deflector plates lie between and beneath the shakers inclined towards the conveyors to guide berries shaken off by the shakers and falling therebetween. The shakers are rotated by cooperation of the tines with the plants as the harvester moves thereover.

The drive for the shakers consists of two vibrating head assemblies and a high speed input in each assembly driven in synchronization but in opposed rotary direction by a single high speed prime mover. The high speed input is transmitted to an eccentric mounted on an input shaft in each assembly, the rotation of the eccentric producing pivoting of a link pivotally mounted on a rotatable housing for the input shaft. The housings are linked for synchronized contra-rotation. The movement of each link is transmitted by a crank to an output shaft of the associated assembly as a torsional vibration. The output shafts and shakers connected thereto are allowed to rotate under the action of the plants thereon by virtue of the rotatable housing and are also shaken by the high speed torsional vibration applied by the vibrating head assemblies.

In a modified drive more suitable for use with blackcurrent harvesters, a separate prime mover which drives the harvester also provides a positive rotation of the housings and hence the shakers in contra-rotation.

6 Claims, 9 Drawing Figures

DRIVE MEANS AND HARVESTING APPARATUS INCORPORATING SAME

This invention relates to improvements in harvesting apparatus and in particular a drive means for said apparatus. The type of harvesting apparatus concerned is of the kind used to traverse rows of producing plants and bushes, and to shake or vibrate these bushes to dislodge berry fruits and the like produce therefrom, such as raspberries, blackcurrants and the like, during harvesting.

In previously known harvesting apparatus, in which tined shaker members are actuated to vibrate or shake the producing plants or bushes to thus dislodge the fruit and the like from the plants, there has been, among other things, the problem inherent in such apparatus, how to prevent undue vibration from being imparted to the main frame or body of the apparatus, in particular when the machines are working in bushes having a dense or heavy growth. In many known machines the vibrations of the tined shaker members are provided by reaction forces produced by the drive in relatively heavier reaction or counter members. When however the lighter tined shaker members become bogged down in heavy growth they will attempt to move the heavier reaction members with little success and the reaction members will then subject the apparatus to heavy vibrations which damages the apparatus. Moreover such reaction type members require a high energy input to produce effective shaking forces.

Another problem in such apparatus is the loss of fruit which does not fall onto conveyors beneath the shakers but onto the ground below between the shakers.

A further problem is the passage of the shakers past obstructions in its path without causing damage to the shakers.

Such problems have until this time limited the design and application of such harvesting apparatus.

It is one object of this invention to provide a harvesting apparatus and drive means therefor which overcomes these and other problems which have been apparent up to this time.

It is a further object of this invention to provide a harvesting apparatus and drive means therefor which may be adjusted or adapted to suit the density and form of growth of the plants.

It is another object of the invention to provide a drive means for harvesting apparatus which may be readily adapted to suit harvesting from plants which have different characteristics and are of a different nature such as raspberries and blackcurrants for example. Raspberry plants have a less flexible stem and branches than blackcurrant plants and consequently a versatile drive means for harvesting apparatus of various types is desirable.

Other objects of this invention may become apparent from the following description:

According to one aspect of the present invention, a drive means for a pair of tined shaker members is provided. The drive means comprises a single high speed prime mover and two vibrating head assemblies, and means effecting a synchronized driving connection between the high speed prime mover and an input of each of the vibrating head assemblies transmits a synchronized high speed rotation from the prime mover to the inputs causing same to rotation in opposite directions with respect to each other. The assemblies each include a housing rotatably mounted in the casing, an input member and an output member rotatably mounted in each housing. The output member is in driving connection with one of the shaker members and linked to the housing for rotary movement therewith. Means are provided between the input and output members producing a highspeed torsional or rotary vibration in the output member. The housings are linked for synchronized rotational movement in opposed rotary directions. The arrangement is such that a synchronized rotary motion may be effected by the output members in opposed directions together with the torsional or rotary vibration produced in synchronization in the output members in the same rotary direction. In this manner, the opposed tines provided on the shaker members which engage in an object passing therebetween as the shaker members rotate in contra-rotation simultaneously, effect a shake of maximum intensity on opposite sides of the object.

In one preferred embodiment of the invention, the drive means includes a further prime mover of slower speed. Means are provided for coupling the further prime mover to the housing members whereby a synchronized rotational movement in opposed rotary directions is transmitted from the further prime mover to the housings to turn the shaker members in opposed rotary directions and engage the tines thereof into the object passing therebetween.

Preferably, the means for effecting the synchronized driving connection between the high speed prime mover and the input of each of the vibrating head assemblies comprises a first pair of interengaging gears in driving connection with the high speed prime mover and producing a high speed rotary motion in opposed directions. Means are provided for connecting each of the first pair of interengaging gears in driving engagement with a separate input of the vibrating head assemblies to transmit the high speed rotation from the prime mover to the inputs but in contra-rotation one with respect to the other. Further, the means are provided which are situated between the input and output members in each assembly for producing a high speed torsional or rotary vibration in the output member thereof. This means preferably comprises an eccentric mounted on the input shaft, a link member pivotally mounted to the housing and in cooperation with the eccentric, such that the high speed rotation of the eccentric imparts a "to and fro" high speed pivoting movement in the pivotally-mounted link member. A crank member is operatively connected between the link member and the output shaft such that the high speed pivoting movement of the link member is transmitted to the output member by the crank member as a high speed torsional vibration.

The torsional vibration produced in the output shafts is a simple harmonic motion.

The invention will be better understood and additional objects will become apparent from the following specification and claims considered in conjunction with the drawings in which:

FIG. 7 is composed of sections A, B and C, showing the drive means of the present invention, FIG. 7A showing one vibrating head assembly thereof;

The harvesting apparatus according to the present invention and as shown in the drawings (FIGS. 1-6) is provided with a main frame generally indicated by arrow 1, mounted on ground wheels 2 and being of the "straddle type", in which the wheels (four being shown) move on either side of a row of producing plants, bushes or the like to be harvested, the frame passing over and around the plants, bushes or the like. The ground wheels are driven by a suitable prime mover 3, the transmission therebetween not forming an essential part of the invention and not being shown in detail.

The main frame 1 supports two prime movers 3 and 4 and drive mechanism and linkages (not shown in detail) for the apparatus. The prime movers 3, 4 and drive mechanism are preferably mounted on the top frame 1a of the main frame 1, side frames 1b depending from the top frame 1a. The front and rear of the apparatus are open to enable the passage of the apparatus over the plants. The side frames 1b of the frame 1 are preferably filled as at 23 by means such as mesh or the like for example, for the sake of cleanliness, safety and to contain any fruit within the confines of the apparatus as it falls free from the plants.

Within the confines of the frame, two cylindrical shaker members 5, 6 depend downwardly one on either side of the frame and each having their lower ends mounted in mounting or bearing blocks 7, 8 which are themselves slidably guided in a channel 14 formed in support membrs 9 extending within the frame 1 substantially transversely to the direction of movement thereof and positioned near the lower end of the apparatus. The slide members 7, 8 are each biassed towards each other by spring means, such as a tension spring 17 provided at the inner end of each channel 14, whereby the longitudinal axes of the cylindrical shakers are normally inclined to the vertical. Under normal operation the longitudinal axes would be inclined at about 5 degrees from the vertical and inwardly of the frame, the necessity for the shafts being inclined to the vertical lying in the fact that the bushes at the time of full fruiting tend to lean outwardly on an angle. Consequently in order to get the maximum vibration of the shaker members the tines or fingers should also lean outwardly. With raspberries the area where the fruit grows bushes out much wider at the top than it does at the bottom since at the base of the plant there is only sucker growth, whereas the fruit forms at the top and consquently by inclining the shaker members from the vertical toward the top of the frame greater access for the fruit to pass into the space between the shaker members is provided whereby the fruit may be more adequately moved.

The cylindrical shaker members 5, 6 are each suitably formed by a pair of discs (not shown) mounted spaced on longitudinal shafts 5', 6' and provided with a curved sheet 5", mounted therearound extending between the discs. The upper ends of shafts 5', 6' are each connected to a drive hereinafter described by a universal joint 11, 12 provided in the upper portion of the frame 1 and from which each shaker member 5, 6 is suspended. The lower ends of the shafts are suitably formed to bear rotatably in appropriate apertures 19, provided in the slidable bearing blocks 7, 8 which form bearings for the lower ends of the shafts and enable the free rotation of the shaker members 5, 6 between their associated universal joints 11, 12 and the bearing members 7, 8.

A plurality of tines or finger members 13 are inserted into holes drilled in the cylindrical surfaces 5", 6", of the shaker members 5, 6 and welded thereto to extend radially from the cylindrical surfaces 5", 6", and are suitably provided in sets encircling this cylindrical surface and at spaced intervals along the length of the shaker members 5, 6. The tines or fingers 13 are intended to engage in the adjacent parts of the producing plants as the harvesting apparatus moves straddled thereover. The slidable mounting of the bearing blocks 7, 8 for the lower ends of the shaker members 5, 6 enables the distance between the shaker members 5, 6 to be varied whereby when the apparatus passes over obstructions, such as fence posts and supports in its path, the shaker members 5, 6 may be moved laterally out of the way by contact with the posts or supports, the spring means 17 enabling their ready return to their original position after passing the obstructions. Within the frame 1 there extend inner longitudinal guide members 15 provided with lead-in or splayed ends 16 for the plants forwardly of the members 15 and arranged to pass on either side of the row of plants near the ground as the apparatus moves thereover. The guide members 15 are mounted to the frame 1 by transverse beams or members 10 connecting with longitudinal side members 20 of side frame 1b.

Figure 1:
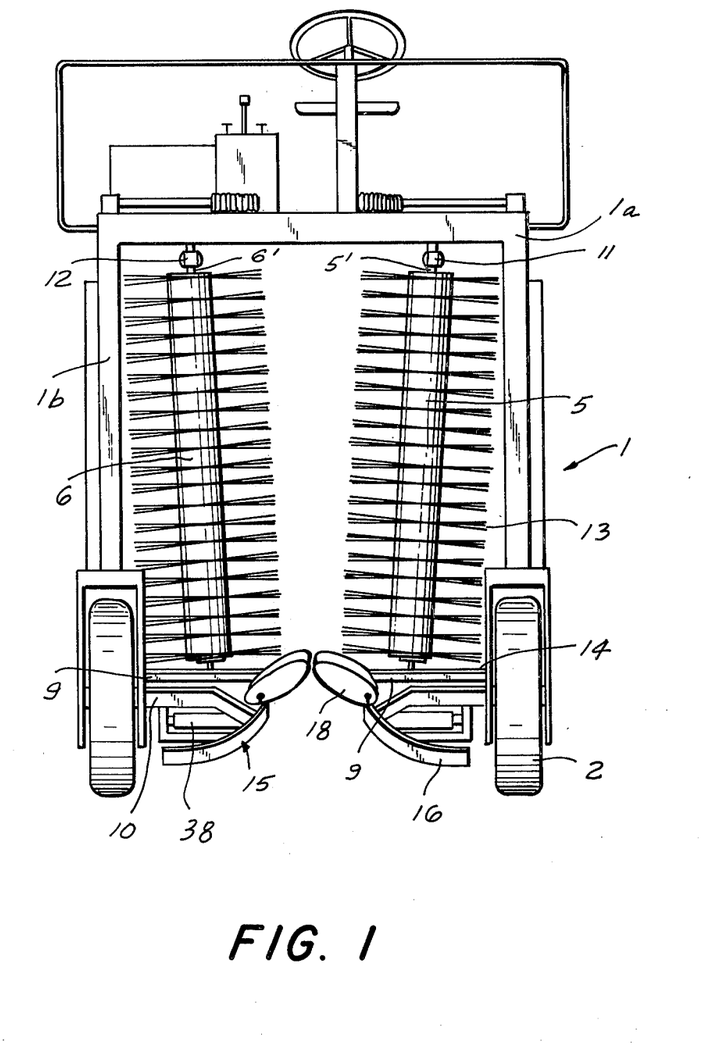
FIG. 1 is a front elevational view of a preferred form of the harvesting apparatus of the present invention particularly suitable for harvesting raspberries, and more particularly showing the main constructional features but omitting ancilliary features for the sake of clarity.
Figure 2:
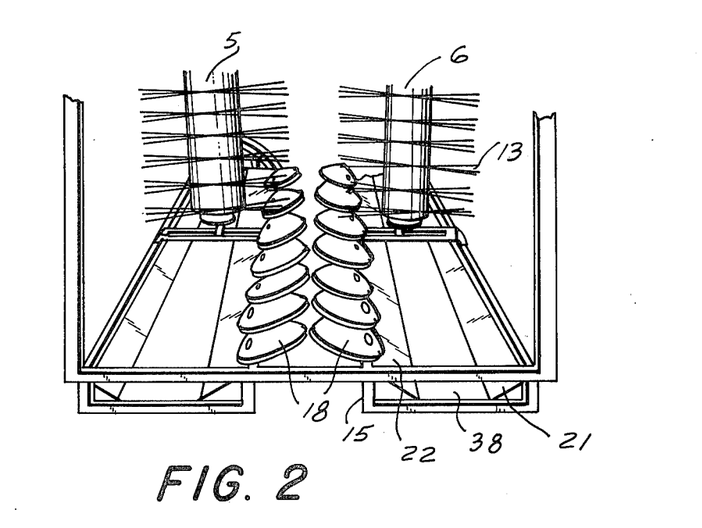
FIG. 2 is a rear fragmentary perspective view of the apparatus of FIG. 1 with the wheels and part of the conveyor means omitted.
Figure 3:
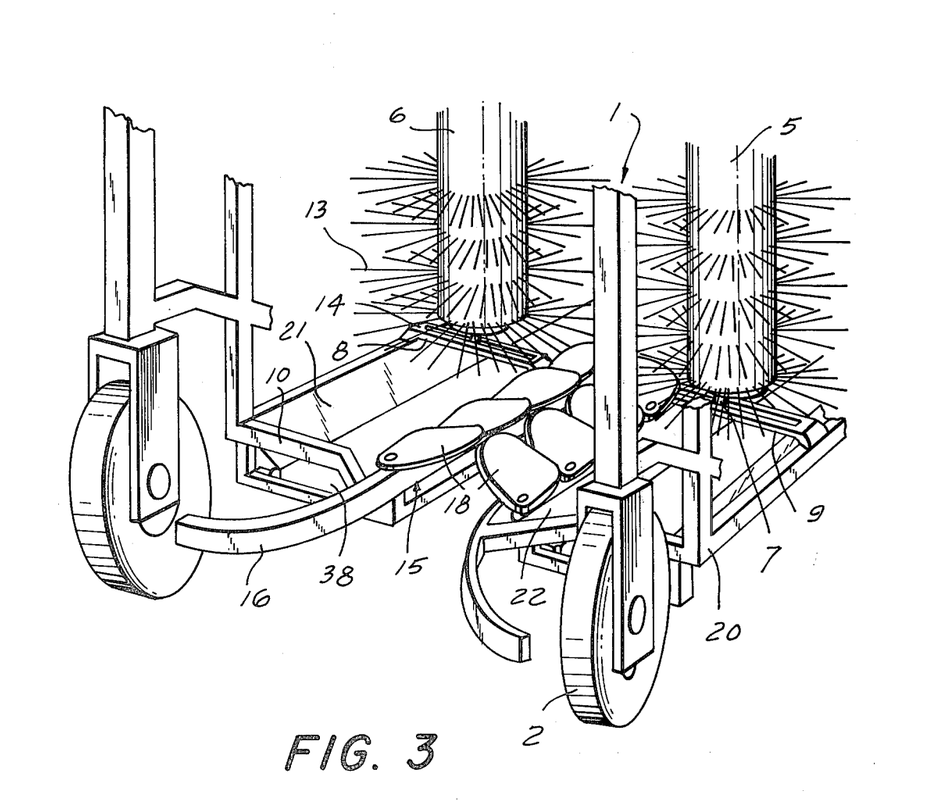
FIG. 3 is a front perspective fragmentary view of the apparatus of FIGS. 1 and 2.
Figure 4:
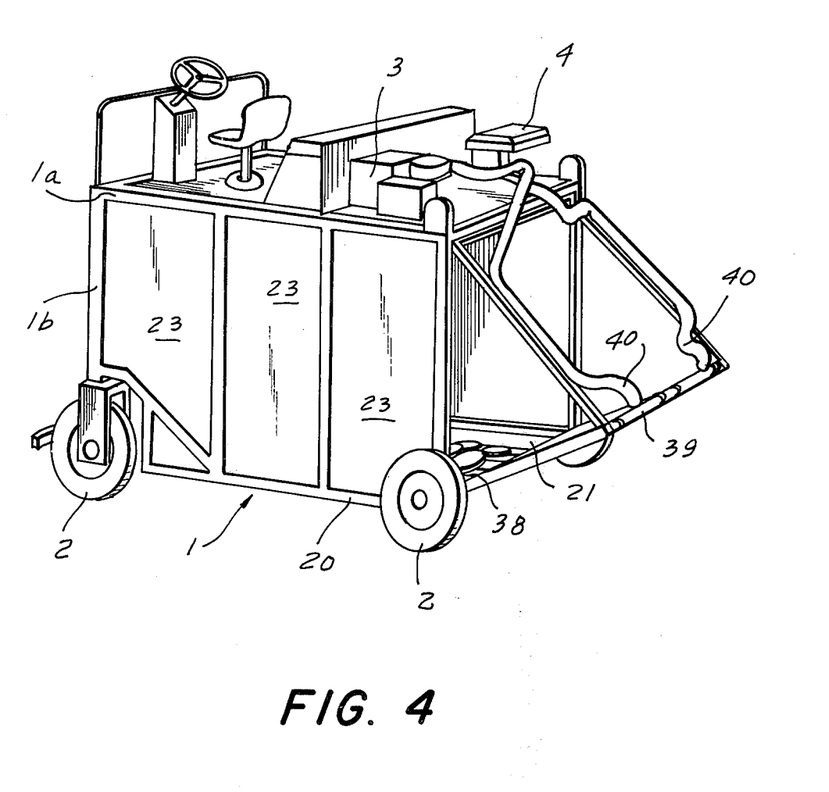
FIG. 4 is a side perspective view of the apparatus shown in FIGS. 1 and 2.

Two rows of substantially planar deflector plates 18 are pivotally mounted on the guide members 15, one row on either side of the frame and these deflector plates 18 extend into the space within the frame 1 between the guide members 15 and lie in the path of the row of plants over which the apparatus moves. The deflector plates 18 as shown in particular in FIG. 3 are of a shape and are arranged relative to one another such that they could be called of "fish-scale" configuration and the plates 18 in each row are mounted so as to interleave with adjacent plates and provide as great a cover for the ground below as possible and leaving a minimum gap therebetween and between the rows. The leading edge of each deflector plate 18 is curved smoothly to enable the smooth passage of plants over this edge and the trailing edge of each deflector plate 18 has a downwardly turned rim 18' to close off any vertical spacing between the plates. The arrangement is such that as the apparatus passes over the producing plants the leading edge of each deflector plate 18 is pushed rearwardly and outwardly away from the plants to enable the free passage of the plants therethrough and after contact with the plants ceases, the deflector plates 18 will pivot back to their initial position to extend inwardly of the frame 1 toward the opposed row of plates 18.

The general plane of each pate 18 is upwardly inclined from its pivotal mounting on the guide member 15 and its innermost edge in its normal rest position lies substantially in contact with its opposite number in the other row of plates or closely adjacent thereto, whereby the fruit or produce shaken from the plants by the rotating shaker members mounted thereabove will be deflected down the incline of the plates 18 to either side onto conveyor means 38 extending longitudinally of the frame 1.

Longitudinal deflector plates 21 are provided extending inclined downwardly from the longitudinal side members 20 to above the conveyor 38 and similar plates 22 are provided extending down from the guide members 15 from just beneath the lower edges of the plates 18 to above the conveyor 38 whereby any fruit falling against the sides 23 of the machine or from the plates 18 will be positively guided onto the conveyor 28. In this way the loss of produce onto the ground is limited and substantially prevented.

Figure 5:
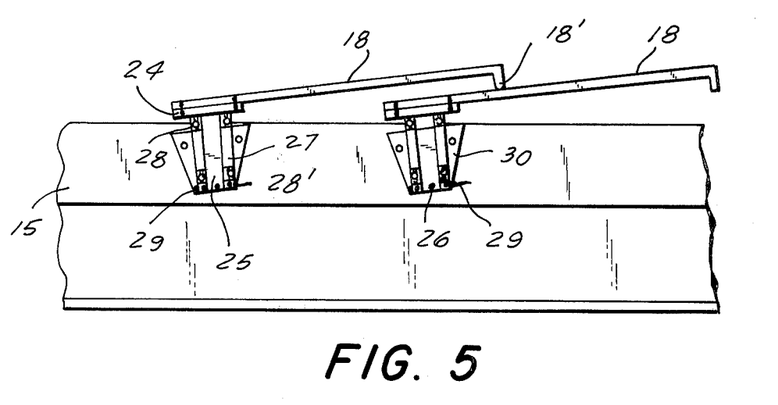
FIG. 5 is a sectional view through two adjacent deflector plates and their mountings.
Figure 6:
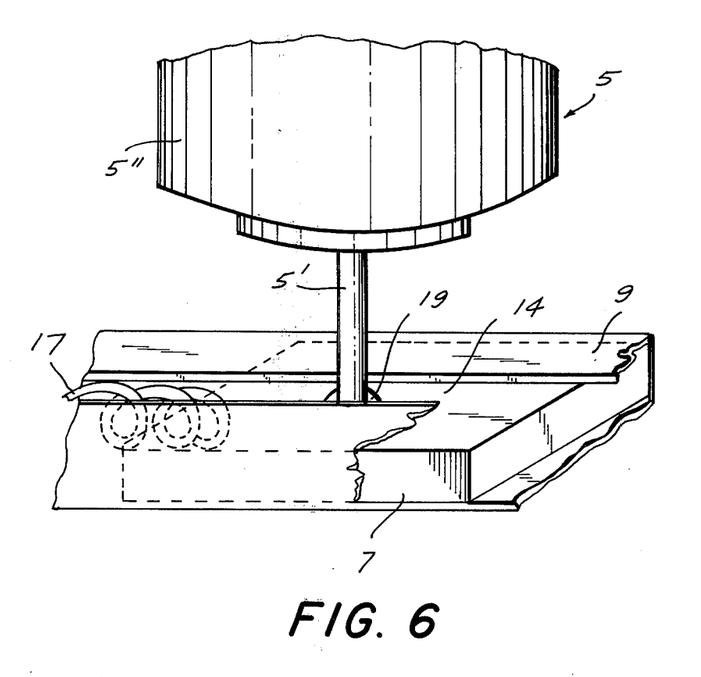
FIG. 6 is a top perspective view partly in section of the slidable mounting for the lower end of the shaker members of the harvesting apparatus shown in FIGS. 1-4.

FIG. 5 shows in more detail the pivotal mounting and relative positions of two adjacent deflector plates 18 in the same row. The plate 18 is suitably fixed, such as by bolts or welding (not shown) to a smaller support plate or backing plate 24 having a short shaft 25 extending perpendicular therefrom, the end of the shaft 25 remote from plate 18 having a groove 26 formed therein. The shaft 25 is mounted within an open-ended bearing member or casing 27 extending beyond the other end thereof and with the aid of ball races 28, 28' therein. A coil spring 29 has one end engaged within the groove 26 and encircles the lower end of the shaft 25 and has its other end in engagement against a mounting bracket 30 extending from the casing 27. The mounting bracket 30 is bolted at an angle as shown in FIG. 5 to the guide members 15 within the frame 1, such that the plane of the deflector plates 18 inclines upwardly as shown. Thus any force applied rearwardly to the leading edge of the plate 18 is arranged to cause the shaft 25 to rotate laterally outwardly of the frame 1 within the bearing member 27 and so tightens up the spring 29. Release of the pressure applied to the plate 18 enables the spring to unwind and return to its original unstressed position. The tension in the coil spring 29 may be tightened by increasing the number of turns therein about the shaft 25.

In use, as the harvesting apparatus moves over a row of plants, planted one in front of the other, the forward splayed ends 16 of the longitudinal guide members 15 extending forwardly of the frame and of the ground wheels 2 engage the sides of the plants as they move inwardly towards the interior of the frame. With continued advance, the plants deflect the plates 18 rearwardly and outwardly to facilitate their passage beneath the apparatus, but the plates 18 at the same time receive any fruit falling thereon and deflect it downwardly onto the conveyors 38. As the plants pass the shaker members 5, 6, the tines or fingers 13 protrude into the plants and the tines are rotated thereby and at the same time they are agitated by the drive means described hereinbelow, thus shaking off the ripe fruit.

It is preferable that the plants be suitably pruned during their growth to facilitate their passage beneath the frame in co-operation with the harvesting apparatus to produce the best harvesting effect.

The conveyors in the form of conveyor belts 38, mounted beneath the level of the guide members 15 and side members 20 and transverse beams or members 9, 10, receive the fruit falling from the agitated bushes. The conveyor belts 38 move the fruit falling thereon rearwardly of the apparatus onto a further upwardly inclined conveyor belt 39 extending from the rear of the machine, and beneath the outer end of which fruit containers (not shown) may be provided such as on moving trolleys or the like, following behind the harvesting apparatus and preferably attached thereto.

It is envisaged that alternative suitable conveying systems may be provided for removing fruit from the apparatus.

Suitable rollers and pulleys and belts are provided (but not shown in detail) such as shown at the upper end of the inclined conveyor belt 39 and suitable drive mechanism (not shown) is provided for moving the conveyor belts 38, 39 as required.

At the upper inclined end of the inclined conveyor belt 39, it is preferable that suction means 40 be provided to suck away the lighter debris, such as leaves and loose stalks and thus limit as much as possible the debris received in the collecting container with the fruit. Alternatively if desired a blower system could be provided to winnow away this debris.

Figure 7A:
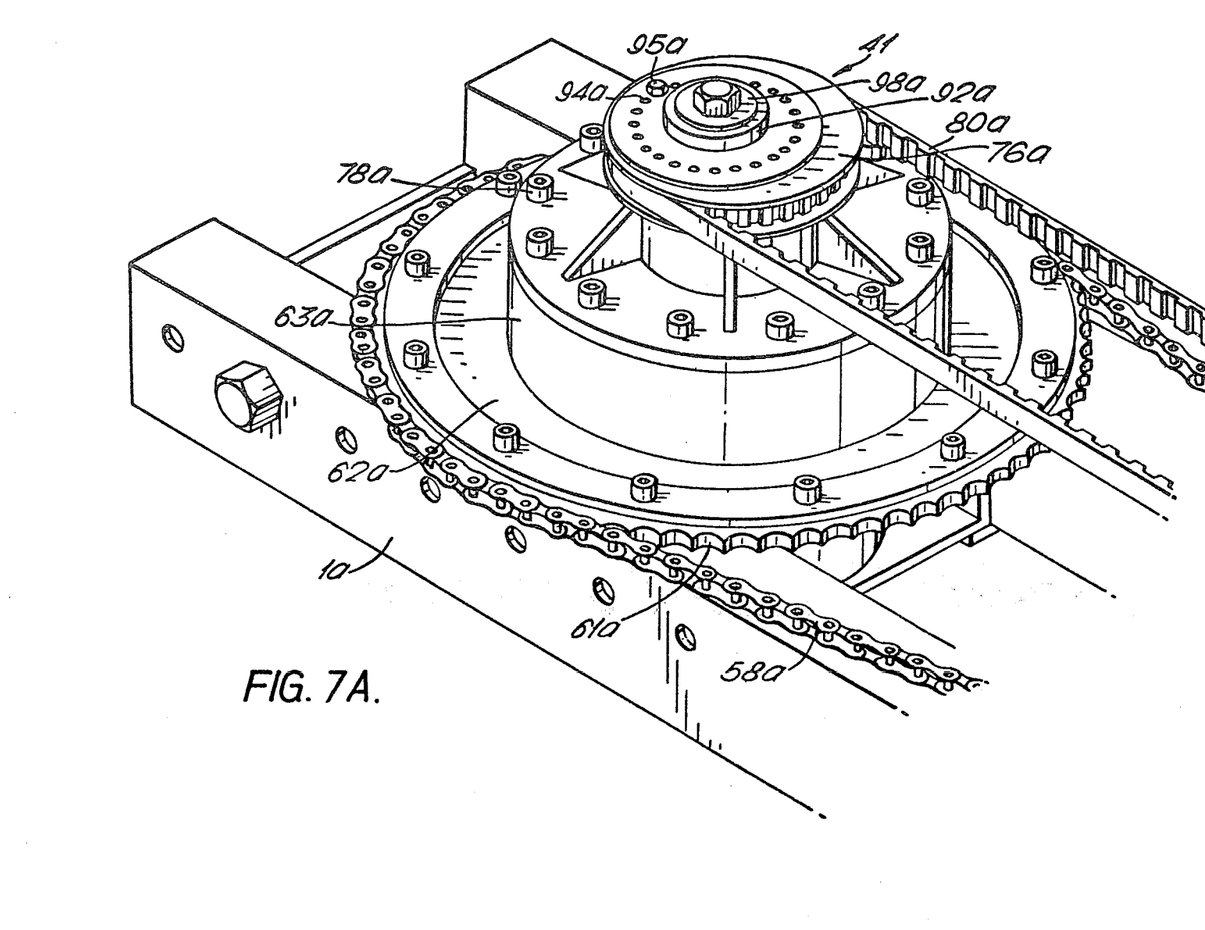
Figure 7B:
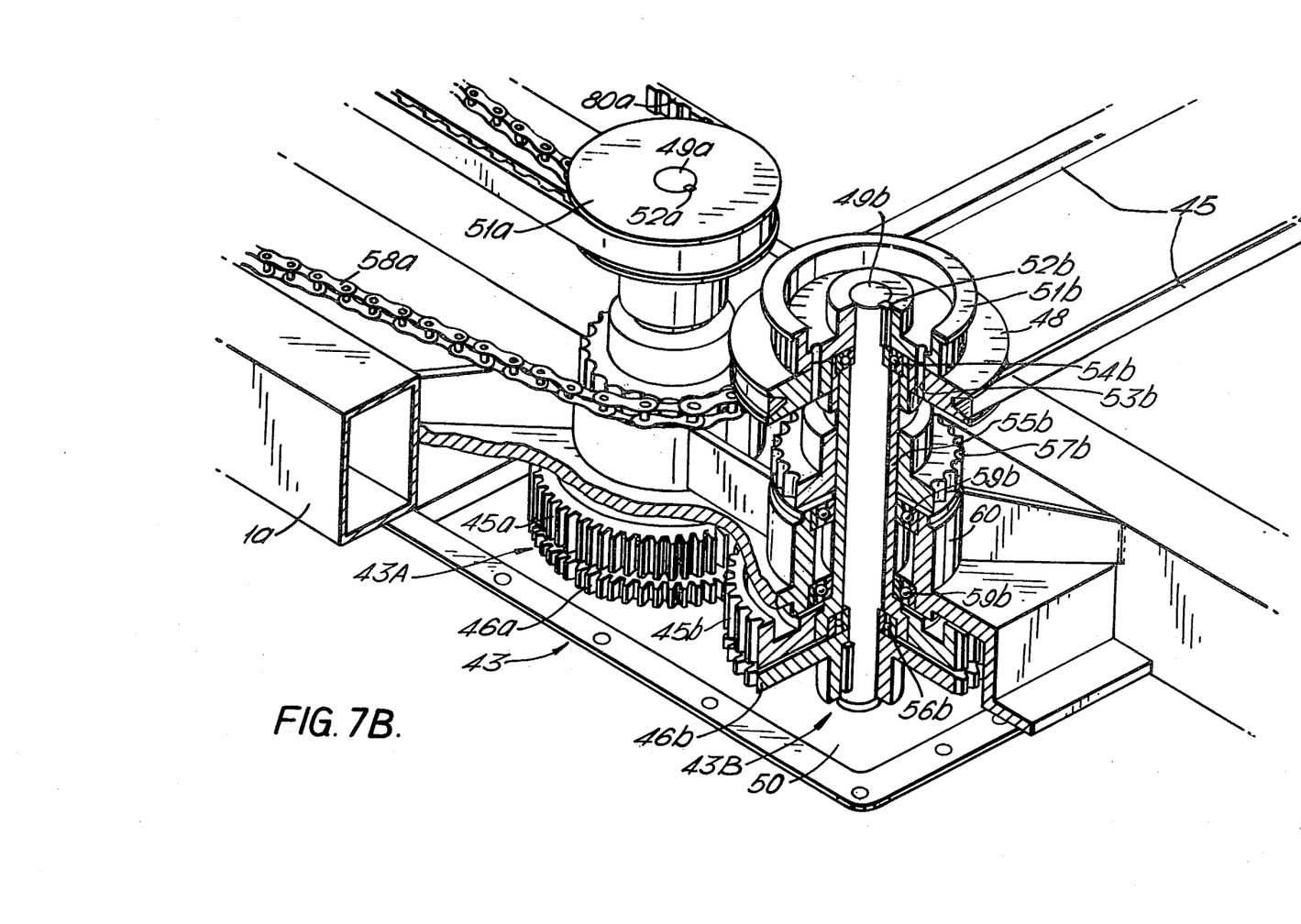
FIG. 7B showing the gear arrangement thereof.
Figure 7C:
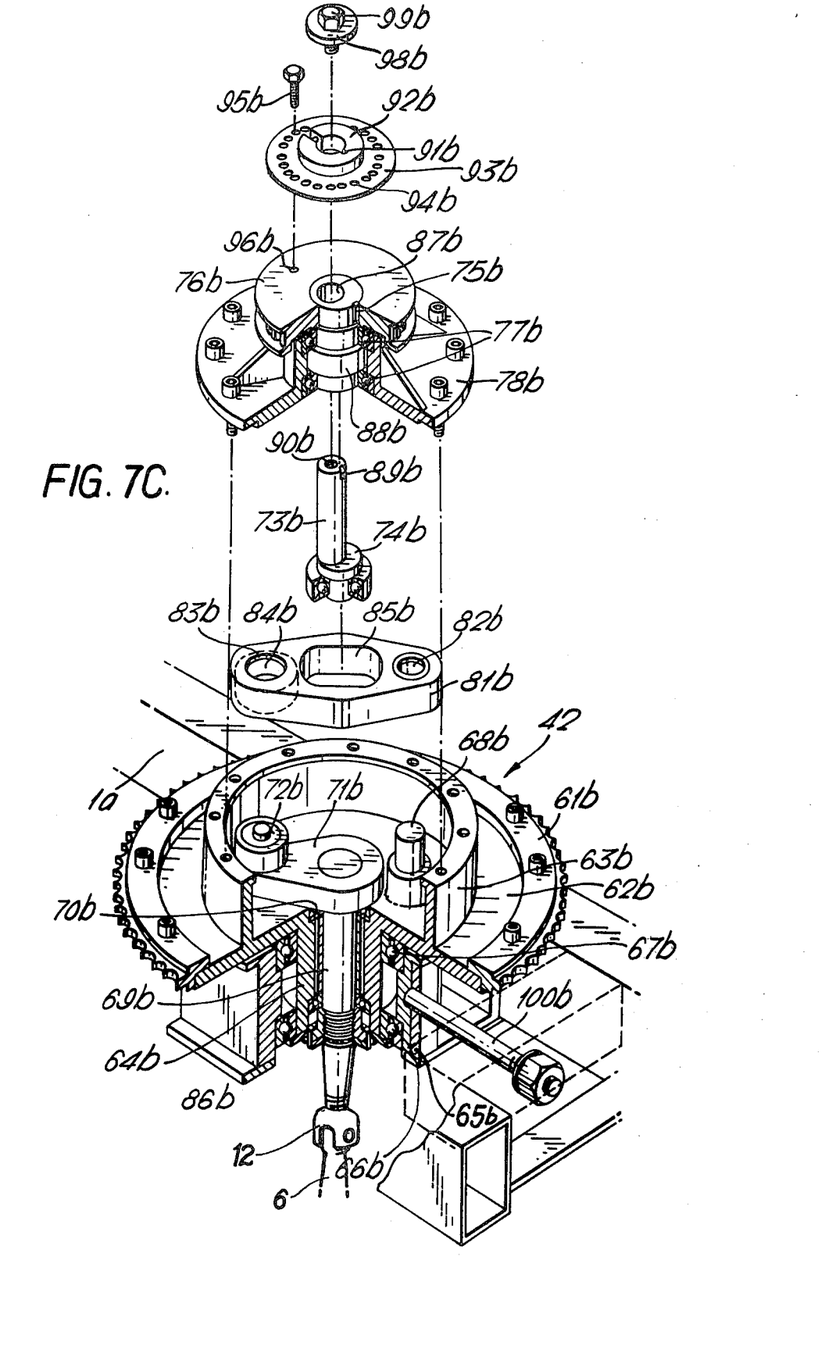
FIG. 7C showing the second vibrating head assembly thereof in exploded form and FIG. 8 shows the gear arrangement of a modified form of drive means according to the invention.

The drive for the present invention is shown in more detail in FIG. 7 (A, B and C) and comprises two vibrating head assemblies indicated generally by arrows 41 and 42 and a gear arrangement indicated generally by arrow 43 suitably mounted on the top frame 1a of the harvesting apparatus with the gear arrangement 43 positioned substantially mid-way of the vibrating head assemblies 41, 42.

As shown in FIG. 7B the gear arrangement 43 is provided with two pairs of gears 43A, 43B, the second pair of gears 43B being coupled to a high speed prime mover 4. The high speed input from the high speed prime mover 4 is transmitted by the belt 45, such as a V-belt, to the gear 46b and hence to the gear 46a meshing therewith in a 1:1 ratio to provide a reversal of the high speed rotation to be supplied from these gears.

The gear arrangement 43 is shown partly in perspective view and partly in cross-section, the two portions of the mechanism being substantially similar except that the pulley wheel 48 provided in part 43B which receives the high speed drive is not provided in the part 43A. In the one part 43B of the gear arrangement 43 a shaft 49b is mounted for rotation in suitable bearings (not shown) on a suitable base 50 provided on the top frame 1a of the harvesting apparatus. A pulley wheel 51b is keyed as at 52b to the upper end of the shaft 49b and has likewise keyed thereto as by key 53b the high speed drive pulley wheel 48. A coaxial sleeve 55b is provided encircling the shaft 49b and extending into the drive pulley 48 but clear of it and suitable bearings 54b, 56b, preferably roller or ball bearings, are provided at the upper and lower ends to enable the free rotation of the shaft 49b relative to the coaxial surrounding sleeve 55b. Fixed to or formed integral with the sleeve 55b is a sprocket or toothed wheel 57b toothed to receive a chain not shown in the drawing (for the sake of clarity) but the same as the chain 58a shown in association with the other part 43A of the gear arrangement 43.

The gear 45b is integral with or fixed to the sleeve 55b for rotation therewith and a pair of suitable bearings 59b, 59b are provided mounting the sleeve 55b within the outer housing 60 for the parts 43A, 43B of the gear arrangement 43.

The gears 45a, 45b are enmeshed in a 1:1 ratio and are provided to produce a reversal of any rotation applied to either of these gears. The drive pulley wheel 48 for the high speed input shown in the part 43B of the gear mechanism 43 is omitted from the part 43A. Apart from the provision or non-provision of the pulley wheel 48, the construction of the parts 43A, 43B of the gear arrangement 43 is substantially identical but reversed where necessary to produce a balance in the rotary and vibratory movements produced in the vibrating head assemblies 41, 42 and produce contra-rotation. The high speed input from the secondary high speed prime mover 4 via belt 45 to pulley wheel 48 is transmitted via shaft 49b and the gear 46b and thence to drive shaft 49a and cogged wheel 51a. A cogged wheel 51b is fixed above pulley wheel 48 for rotation therewith and cog belts 80a and 80b (the latter not shown for the sake of clarity but identical with 80a) transmit the high speed rotation to the cogged wheel 76a and 76b of the vibration head assemblies 41, 42 respectively.

The chains 58a, 58b, transmit the contra-rotation from the sprocket wheel 57a, 57b, with which they are keyed respectively, to a toothed wheel 61a, 61b of the vibrating head assemblies 41, 42.

The drawing (FIGS. 7A and C) show the one vibrating head assembly 41 in elevational view and the other 42 in exploded view and partly in section.

As can be seen from FIG. 7c, the tooth wheel 61b is carried on a flange portion 62b of a housing 63b of the vibrating head assembly 42 and which is rotatably mounted within a surrounding casing 65b for suitable rotation therein, with the provision of lower and upper bearings 66b and 67b to facilitate this rotation. Casing 65b is fixed to the main frame 1 of the harvesting apparatus. The toothed wheel 61b is preferably provided as an annular strip which is removably mounted on the flange 62b for ready replacement when the teeth are worn.

Within the housing 63b there is provided an upstanding pin 68b. Furthermore an output shaft 69b is mounted by means of a bearing 70b, for example a ball or roller bearing, for rotation relative to the sleeve 64b and housing 63b. The upper end of the output shaft 69b has a crank 71b fixed thereto and provided with an upstanding member 72b at the other end.

An input shaft 73b is provided having an eccentric 74b attached thereto at one end thereof, the other end of the input shaft 73b being engaged within an eccentric bore 87b in a sleeve 88b which is keyed such as at 75b to the cogged wheel 76b and which is mounted by means of bearings 77b for rotation relative to the cover 78b and hence housing 63b.

The end of the input shaft 73b engaged within the eccentric bore 87b is provided with a keyway 89b and an aperture or bore 90b, the keyway being provided to co-operate with corresponding keyway 91b provided in a substantially annular, mounting member 92b provided with a flange 93b extending radially outwardly therefrom, the flange 93b being provided with a series of apertures 94b therein in a circle thereon. A pin or screw member of the like 95b is provided for engagement through one or the other of the apertures 94b and into a further bore or aperture 96b provided in the pulley wheel 76b. The mounting member 92b is mounted onto the upper end of the input shaft 73b and keyed thereto by means of a key (not shown) extending into keyways 89b and 91b whereby the shaft 73b and surrounding sleeve 88b are fixed for rotation with the wheel 76b.

The closure disc 98b is screwed onto the upper end of the shaft 73b by means of screw 99b or the like.

Adjustment of the eccentricity of the axis of the shaft 73b relative to the axis of rotation of the wheel 76b may be effected by choice of the aperture 94b coinciding with the aperture 96b for the purpose described below.

Rotation of the cogged wheel 76b is effected by the drive belt 80b, likewise cogged and equivalent to that shown in 80a (FIG. 7a) in the other part of the drive mechanism. The belts 80a, 80b also act as timing belts to synchronize the high speed rotation input to each vibrating head assembly. The high speed input drive is transmitted directly via cogged wheel 51b and belt 80b to the cogged wheel 76b and thus to the input shaft 73b and provides a positive rotary or torsional oscillation to the output shaft 69b by means therebetween in the manner described below, this means including an eccentric 74b, which is in contact with a link member 81b linking the outstanding members 68b and 72b. A suitable bore 82b is provided in link member 81b to enable its mounting over the upstanding member 68b and a further bore 83b is provided therein leading to a recess 84b engaging over the upstanding member 72b.

The high speed rotation transmitted to the input shaft 73b from the high speed prime mover will be converted into a to-and fro vibration or torsional oscillation, by rotation of the eccentric 74b in an aperture 85b provided in the link member 81b, which action due to the pivotal mounting of the link member 81b on pin 68b will cause link member 81b to pivot to-and fro about pin 68b, which to-and fro movement is transmitted to the output shaft 69b from the link member 81b via the upstanding member 72b and the crank 71b.

The effect will be a positive vibratory movement or shake producing a rotary acceleration and deceleration of the output shaft 69b.

Adjustment of the amplitude of vibration can be made by rotation of the flanged mounting member 92b and fixing it in a new position by means of the screw member 95b passing through a different aperture 94b into aperture 96b. This will alter the relative position of the centre of the shaft and the eccentric 74b relative to the centre of the shaft 69b and thus enable the variation in the amplitude of the vibration transmitted to the dhaft 69b. The frequency of vibration can be varied by altering the speed of the high speed prime mover.

This movement of the output shaft 69b will likewise be provided for the equivalent shaft (which is not shown in the drawing) for the other vibrating head assembly 41 (FIG. 5A) and the acceleration and deceleration will be in same rotary directions.

The outer end of the output shaft 69b is connected by a universal joint 12 to a shaft 6' of the associated cylindrical shaker 6, whereby the movement of the output shaft 69b can be transmitted directly thereto. Similarly the other shakers 5 will be attached to the equivalent output shaft 69a of the unit 41 via universal joint 11. For optimum performance the shaker oscillation imparted to the two vibrating head assemblies must act on either side of the brushes at the same moment in reversed direction and the rotary input to each shaker head in opposed directions is timed by the belts 80a and 80b to be synchronized so that the point of maximum rotation of the tines on the output side of one vibrating head assembly in a clockwise direction for example is at the same moment of maximum rotation of the tines of the other vibrating head assembly in the clockwise direction, although the rotary input to the vibrating head assemblies are in reverse direction. This configuration results in the shake of the tines on opposite sides of a bush over which they are passing being opposed and thus giving a maximum shake to the brushes.

Tightening of the chains 58a, can be effected by means of tensioning bolts 100b, (shown in FIG. 7 only) but existing for each assembly 41, 42 which may be released to draw the vibrating head assemblies 41, 42 outwardly.

It will be appreciated that the main prime mover 3 merely serves to drive the ground wheels of the apparatus and no interconnection between the prime mover 3 and the input shaft 73 of the vibrating head assembly will be made. The high speed vibrations will be transmitted to the input shaft 73 of the two vibrating head assemblies and a progressive rotation will be imparted to the cylindrical shaker members 5, 6 by reaction of the tines with the bushes as the apparatus passes thereover and due to the interengagement of the second pair of gears 45a, 45b, the output shafts 69a, 69b, will rotate in unison and in opposite rotary directions. The rotation progressive imposed by the tines on one shaker member in their traverse along a row of bushes is transmitted to the other shaker member via the output shaft 69 to which they are attached and housing 63 of the vibrating head assemblies, the chain drive 57, 58 and the pair of gears 45a, 45b, and thus maintained in synchronized but reversed direction.

If the shaker members 5, 6 were allowed to free-turn without interconnection by chains 58a, 58b, and the gears 45a, 45b, then negligible shake would be imparted to the bushes. However, it has been found that by setting the links to each assembly at 90° to each other the actual shake of the shaker members of one vibrating head assembly are controlled by the shake of the shaker member of the other vibrating head assembly and thus minimum shake is transferred back to the machine.

Thus it will be appreciated that the harvesting apparatus according to the invention provides an efficient and adaptable machine for the harvesting of berry fruits, in particular raspberries, in which the vibration of the plants by the shaker members enables the dislodging of the fruit from the plants to fall and be collected on the conveyors positioned beneath the shaker members and their transport to the rear of the machine for collection. The provision of the return-biassed interleaved deflector plates ensures the minimum loss of fruit falling on the ground between the shaker members yet enabling the steady and uninhibited movement of the plants through the apparatus. The slidable spring-biassed mounting for the lower ends of the shaker members also overcomes any obstructions in the rows of plants and prevents any damage or jamming of the shaker members.

The oscillation from each of the two head assemblies are balanced by virtue of the mechanical configuration and drive system in conjunction with the timing of the vibrating head assemblies through the gear arrangement, thus eliminating as much as possible reactionary forces therein and minimizing the amount of vibration to be absorbed within the machine, in particular, where a heavy growth of bush is encountered by the shaker members.

The balanced form of the apparatus provides two shaker members which on working in unison and producing a high speed oscillation or shake in opposed directions on either side of a bush counteract each other in the bush, thus preventing the formation of heavy vibrations in the frame and apparatus itself as well as overcoming any tendency of the shaker members to stall. This produces a drive which is sufficiently adaptable to overcome differences in density of bushes. Furthermore the stroke of the apparatus can be varied by adaption of the machine to work with bushes of different density if required.

Figure 8:
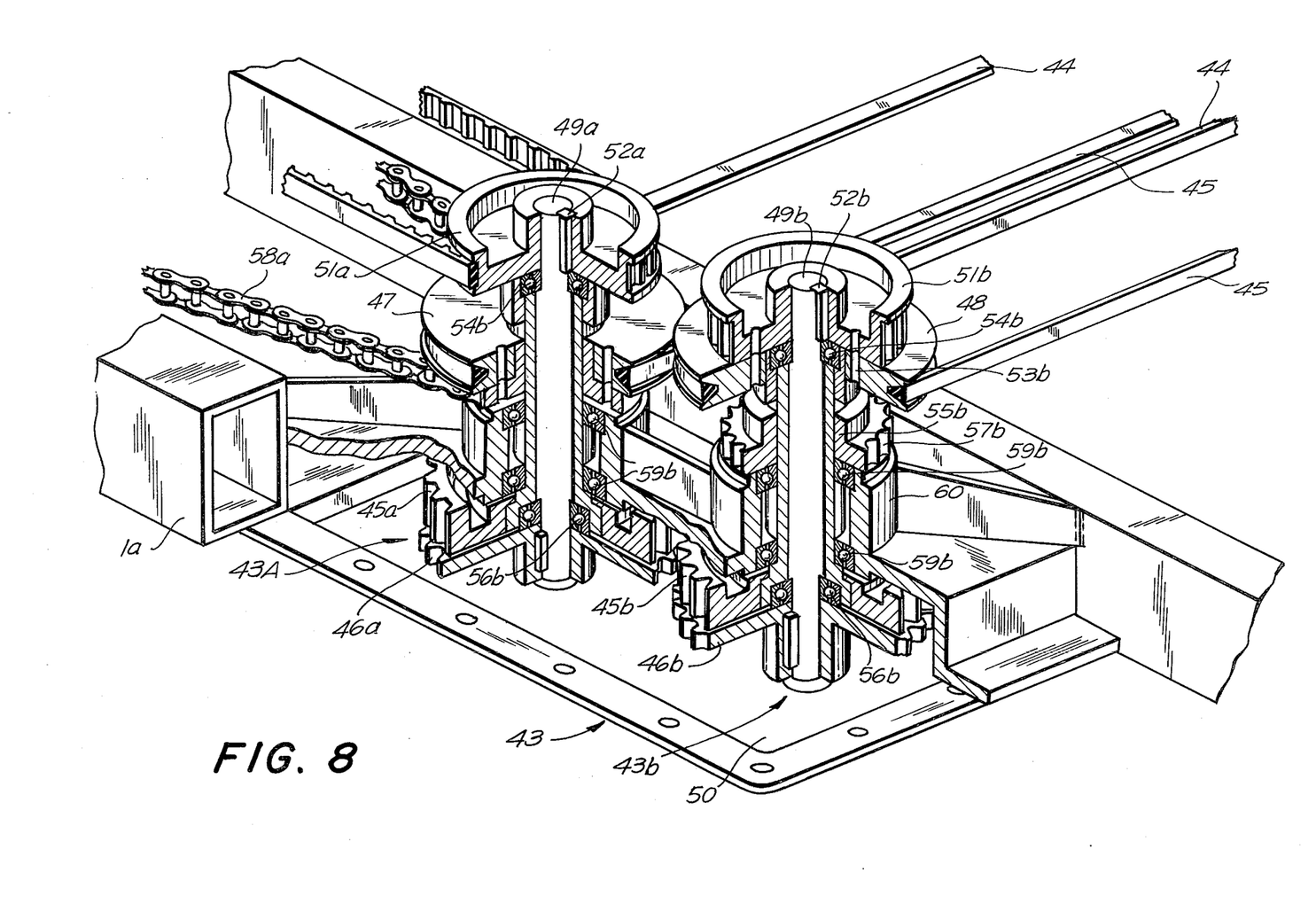

In a modified form of the drive of the invention, the constant rotary motion of the shakers is provided by a positive drive from the main prime mover 3 via the gear arrangement 43. This form of drive is more suited to use in harvesting apparatus particularly adapted to harvesting fruit from plants or bushes which are of a more flexible nature and hence require the positive intrusion of the tines in their midst, such fruit being such as blackcurrants. This modified drive involves the inclusion of a drive belt 44 and a pulley wheel 47 therefor mounted to the sleeve 55a (equivalent to 55b) of part 43A of the gear arrangement and arranged to receive a power drive from the main prime mover 3. Such an arrangement is shown in FIG. 8. The remainder of the drive is as shown in FIGS. 7A, 7B and 7C of the previous embodiment disclosed above. The drive from the main prime mover 3 is transmitted to pulley wheel 47 by belt 44 and thence to sleeve 55a (equivalent to 55b) and to the gear 45a via shaft 49a and thence via gear 45b to sleeve 55b and sprocket wheel 57b. The high speed input from the prime mover 4 is transmitted as in the previous form of drive by belt 45 to wheel 48 and to one vibrating head assemby by cogged belt 80b and to the other vibrating head assembly thence via shaft 49b and gears 46b, 46a to drive shaft 49a and pulley wheel 51a and cogged belt 80a. The chain 58a transmits the movement of the sprocket wheel 57a to the toothed wheel or disc 61a of the vibrating head assembly 41 and likewise the drive from the prime mover 3 is transmitted from wheel 57a via sleeve 55a and gear 45a to gear 45b, sleeve 55b and sprocket 57b, from whence it is positively imparted to toothed wheel or disc 62b by a chain 58b (not shown, but equivalent to 58a).

The link member 81b which is pivotally mounted on the upstanding pin 68b of wheel 62b will have the positive rotation of housing 63b imparted thereon and this will also be imposed on the output shaft 69b via the member 72b and crank 71b, whereby a constant positive rotary motion will be given to the output shaft 69b from the main prime mover commensurate with the average ground speed of the ground wheels of the harvester over the ground. The same constant rotation will be imparted in synchronized contra-rotation in the output shaft 69a by virtue of the chains 58a, 58b.

At the same time the high speed rotation transmitted to the input shafts 73a, 73b from the high speed prime mover will be converted into a to-and fro vibration or torsional oscillation in the manner described in the previous embodiment, by rotation of the eccentrics 74a, 74b in the apertures 85a, 85b provided in the link members 81a, 81b, which action due to the pivotal mounting of the link members 81a, 81b on pins 68a, 68b will cause link members 81a, 81b to pivot to-and fro about pins 68a, 68b, which to-and fro movement is transmitted to the output shafts 69a, 69b from the link members 81a, 81b via the outstanding member 72a, 72b and the cranks 71a, 71b.

The combined effect will be the constant rotary motion of the output shafts 69a, 69b commensurate with the ground speed with a positive vibratory movement producing a resultant rotary acceleration and deceleration of the output shaft 69a, 69b in the same rotary direction. The output shafts 69a, 69b being themselves in driving connection with the shaker members will thus impart the combined motion to the shaker members as they pass along the rows of plants. Tines 13 of the two shaker members 5, 6 will vibrate in opposed sides of the bushes into which they engage in opposite directions.

With this modified form of drive incorporated in a suitable "straddle-type" harvesting apparatus and arranged to drive shaker members provided on either side of bushes with flexible stems, the positive constant rotation imparted by this drive on the shaker members will ensure the more efficient application of the vibratory movement on the bushes whereby the flexible nature of the stalks will not impede the dislodgment of the berry fruits therefrom. It will be appreciated that whilst the drive has been more particularly described in its initial form as incorporated by way of example in one form of harvesting apparatus as shown in the accompanying drawings, various modifications to the harvesting apparatus shown are also envisaged within the scope of the accompanying claims in particular with a view to adapting the apparatus for the harvesting of fruit other than raspberries, such as blackcurrants for example.

It will therefore be appreciated that various modifications of the drive and the apparatus described herein are envisaged within the scope of the invention as set forth in the accompanying claims and the invention is not strictly limited to the arrangements shown and described herein.

We claim:

1. A drive means for a pair of tined shaker members, which comprises a single high speed prime mover; two vibrating head assemblies; means effecting a synchronized driving connection between said high speed prime mover and an input of each of said vibrating head assemblies to transmit a synchronized high speed rotation from said prime mover to said inputs but in contra-rotation one to the other; and in which said assemblies each include a housing rotatably mounted in a casing, an input member rotatably mounted in said housing, an output member rotatably mounted in each housing and in driving connection with one of said shaker members and linked to the housing for rotary movement therewith, and means between said input and output member producing a high speed torsional or rotary vibration in said output member; and in which said housings are linked for synchronized rotational movement in opposed rotary directions, the arrangement being such that a synchronized rotary motion be effected by said output members in opposed directions together with said torsional or rotary vibration produced in synchronization in said output members in the same rotary direction such that opposed tines provided on the shaker members and which engage in an object passing therebetween as the shaker members rotate in contra-rotation simultaneously effect a shake of maximum intensity on opposed sides of said object.

2. A drive means as claimed in claim 1, which includes a further prime mover of slower speed, means coupling said further prime mover to said housing members whereby a synchronised rotational movement in opposed rotary directions is transmitted from said prime mover to said housings to turn the shaker members in opposed rotary directions and engage the tines thereof into the object passing therebetween.

3. A drive means as claimed in claim 1, which includes adjustment means in each vibrating head assembly enabling the adjustment of the amplitude of the torsional vibration of each associated output member.

4. A drive means for a pair of tined shaker members which comprises a single high speed prime mover; two vibrating head assemblies; a first pair of interengaging gears in driving connection with said high speed prime mover producing a high speed rotary motion in opposed directions; means connecting each one of said first pair of interengaging gears in driving engagement with a separate input of said vibrating head assemblies to transmit said high speed rotation from said prime mover to said inputs but in contra-rotation one to the other; and in which said assemblies each include a housing rotatably mounted in a casing, an input shaft rotatably mounted in said housing, an output shaft rotatably mounted in said housing and in driving connection with one of said shaker members, an eccentric mounted on said input shaft, a link member pivotally mounted to said housing and cooperable with said eccentric such that the high speed rotation of the eccentric with the input shaft is arranged to impart a to and fro high speed pivoting movement in said pivotally mounted link member, a crank member in operative connection between said link member and said output shaft, whereby said high speed pivoting movement of the link member is transmitted to said output member by said crank member as a high speed torsional vibration; said housing members being linked for synchronised rotational movement in opposed rotary directions, the arrangement being such that a synchronised rotary motion may be effected by said output members in opposed directions together with said torsional or rotary vibration produced in synchronisation in said output shafts in the same rotary direction such that opposed tines provided on the shaker members and which engage in an object passing therebetween as the shaker members rotate in contra-rotation simultaneously effect a shake of maximum intensity on opposed sides of said object.

5. A drive means as claimed in claim 4, in which each of said housing members is linked by a toothed or cogged belt to a toothed or cogged wheel which is in driving connection with one of a second pair of interengaging gears whereby rotational movement of the housing members is synchronised in opposed rotary directions to ensure that the shaker members turn in unison as the tines engage in opposed sides of the object passing therebetween.

6. A drive means as claimed in claim 4, in which the longitudinal axis of rotation of each input shaft is spaced laterally of the longitudinal axis of its associated output shaft in each vibrating head assembly; adjustment means being provided in each vibrating head assembly enabling the adjustment of said lateral spacing to alter the amplitude of the torsional vibrations superimposed on the associated output shaft.

* * * * *